(12) United States Patent
Serkh et al.

(10) Patent No.: US 10,087,994 B2
(45) Date of Patent: Oct. 2, 2018

(54) ISOLATING DECOUPLER

(71) Applicant: GATES CORPORATION, Denver, CO (US)

(72) Inventors: Alexander Serkh, Troy, MI (US); Ilya Kleyman, Bloomfield Hills, MI (US)

(73) Assignee: Gates Corporation, Denver, CO (US)

( * ) Notice: Subject to any disclaimer, the term of this patent is extended or adjusted under 35 U.S.C. 154(b) by 220 days.

(21) Appl. No.: 15/132,804

(22) Filed: Apr. 19, 2016

(65) Prior Publication Data

US 2017/0298995 A1 Oct. 19, 2017

(51) Int. Cl.

| F16D 7/02 | (2006.01) |
|---|---|
| F16D 41/20 | (2006.01) |
| F16H 55/36 | (2006.01) |
| F16D 13/76 | (2006.01) |
| F16D 3/12 | (2006.01) |
| F16D 13/08 | (2006.01) |

(52) U.S. Cl.
CPC ............ *F16D 7/022* (2013.01); *F16D 3/12* (2013.01); *F16D 13/76* (2013.01); *F16D 41/206* (2013.01); *F16H 55/36* (2013.01); *F16D 13/08* (2013.01); *F16D 2300/22* (2013.01); *F16H 2055/366* (2013.01)

(58) Field of Classification Search
CPC ...... F16H 55/36; F16H 2055/366; F16D 3/12; F16D 7/022; F16D 13/08; F16D 13/76; F16D 41/206; F16D 2300/22
See application file for complete search history.

(56) References Cited

U.S. PATENT DOCUMENTS

| 5,139,463 A | 8/1992 | Bytzek et al. |
|---|---|---|
| 6,044,943 A | 4/2000 | Bytzek et al. |
| 6,083,130 A | 7/2000 | Mewissen et al. |

(Continued)

FOREIGN PATENT DOCUMENTS

| DE | 371314 C | 3/1923 |
|---|---|---|
| WO | 2005057037 A1 | 6/2005 |

OTHER PUBLICATIONS

European Patent Office, Notification of Transmittal of the International Search Report and Written Opinion of the International Searching Authority, or the Declaration, application No. PCT/US2017/028161, dated Jul. 12, 2017.

*Primary Examiner* — Richard M Lorence
(74) *Attorney, Agent, or Firm* — Jeffrey A. Thurnau, Esq.; Paul N. Dunlap, Esq.

(57) ABSTRACT

An isolating decoupler comprising a shaft, a pulley having an inner surface, a pulley rotationally engaged about the shaft, a torsion spring having a first section having a major diameter and a second section having a minor diameter, the major diameter is greater than the minor diameter, the torsion spring engaged with the shaft, a wrap spring having an outer diameter greater than an inner surface diameter, the wrap spring frictionally engaging the inner surface, the wrap spring loaded in an unwinding direction, the torsion spring having an end fixedly connected to the wrap spring, the torsion spring loaded in an unwinding direction whereby the diameter of each coil of the torsion spring decreases in a progressive sequence as a load increases, the first section is disposed radially inboard of the wrap spring such that the first section moves radially outward to clamp the wrap spring during a load condition.

12 Claims, 10 Drawing Sheets

(56) References Cited

U.S. PATENT DOCUMENTS

| | | |
|---|---|---|
| 7,153,227 B2 | 12/2006 | Dell et al. |
| 7,207,910 B2 | 4/2007 | Dell et al. |
| 7,766,774 B2 * | 8/2010 | Antchak ................. F16D 7/022 |
| | | 192/41 S |
| 8,678,157 B2 | 3/2014 | Ward et al. |
| 8,888,622 B2 | 11/2014 | Chen et al. |
| 8,931,610 B2 * | 1/2015 | Serkh ................... F16D 41/206 |
| | | 192/55.5 |
| 2004/0104090 A1 | 6/2004 | Jansen et al. |
| 2009/0176608 A1 * | 7/2009 | Jansen ................... F02B 67/06 |
| | | 474/74 |
| 2010/0116617 A1 | 5/2010 | Serkh et al. |
| 2011/0065537 A1 | 3/2011 | Serkh et al. |
| 2011/0245000 A1 | 10/2011 | Serkh |
| 2012/0298474 A1 | 11/2012 | Ward et al. |
| 2013/0217524 A1 | 8/2013 | Antchak |
| 2013/0237351 A1 | 9/2013 | Marion |
| 2014/0008175 A1 | 1/2014 | Schneider et al. |
| 2015/0027844 A1 | 1/2015 | Serkh |

\* cited by examiner

ISOLATING DECOUPLER

FIELD OF THE INVENTION

The invention relates to an isolating decoupler, and more particularly, to an isolating decoupler having a torsion spring having a first section having a major diameter and a second section having a minor diameter, the second section is disposed radially outboard of a wrap spring such that the second section moves radially inward to progressively clamp the wrap spring to a shaft during a load condition.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 8,931,610 which discloses an isolator decoupler comprising a pulley, a shaft, the pulley journalled to the shaft on a low friction bushing, a spring carrier, the pulley journalled to the spring carrier on a low friction bushing, the spring carrier journalled to the shaft on a low friction bushing, a torsion spring coupled between the pulley and the spring carrier, a one way clutch spring frictionally engaged with the shaft, the one way clutch spring coupled to the spring carrier, the one way clutch spring is disposed radially inward of the torsion spring, and the pulley temporarily engagable with an end of the one way clutch spring whereby the frictional engagement of the one way clutch spring with the shaft is temporarily diminished.

What is needed is an isolating decoupler having a torsion spring having a first section having a major diameter and a second section having a minor diameter, the second section is disposed radially outboard of a wrap spring such that the second section moves radially inward to progressively clamp the wrap spring to a shaft during a load condition. The present invention meets this need.

SUMMARY OF THE INVENTION

The primary aspect of the invention is an isolating decoupler having a torsion spring having a first section having a major diameter and a second section having a minor diameter, the second section is disposed radially outboard of a wrap spring such that the second section moves radially inward to progressively clamp the wrap spring to a shaft during a load condition.

Other aspects of the invention will be pointed out or made obvious by the following description of the invention and the accompanying drawings.

The invention comprises an isolating decoupler comprising a shaft having an outer surface, a pulley rotationally engaged about the shaft, a torsion spring having a first section having a major diameter and a second section having a minor diameter, the major diameter is greater than the minor diameter, the torsion spring engaged with the pulley, a wrap spring having an inner diameter less than an outer surface outer diameter, the wrap spring frictionally engaging the outer surface, the torsion spring having an end fixedly connected to the wrap spring, the torsion spring loaded in a winding direction whereby the diameter of each coil of the torsion spring decreases in a progressive sequence as a load increases, the second section is disposed radially outboard of the wrap spring such that the second section moves radially inward to clamp the wrap spring during a load condition, and the pulley comprising a member disposed to progressively release the wrap spring from the shaft outer surface upon occurrence of a predetermined load condition.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
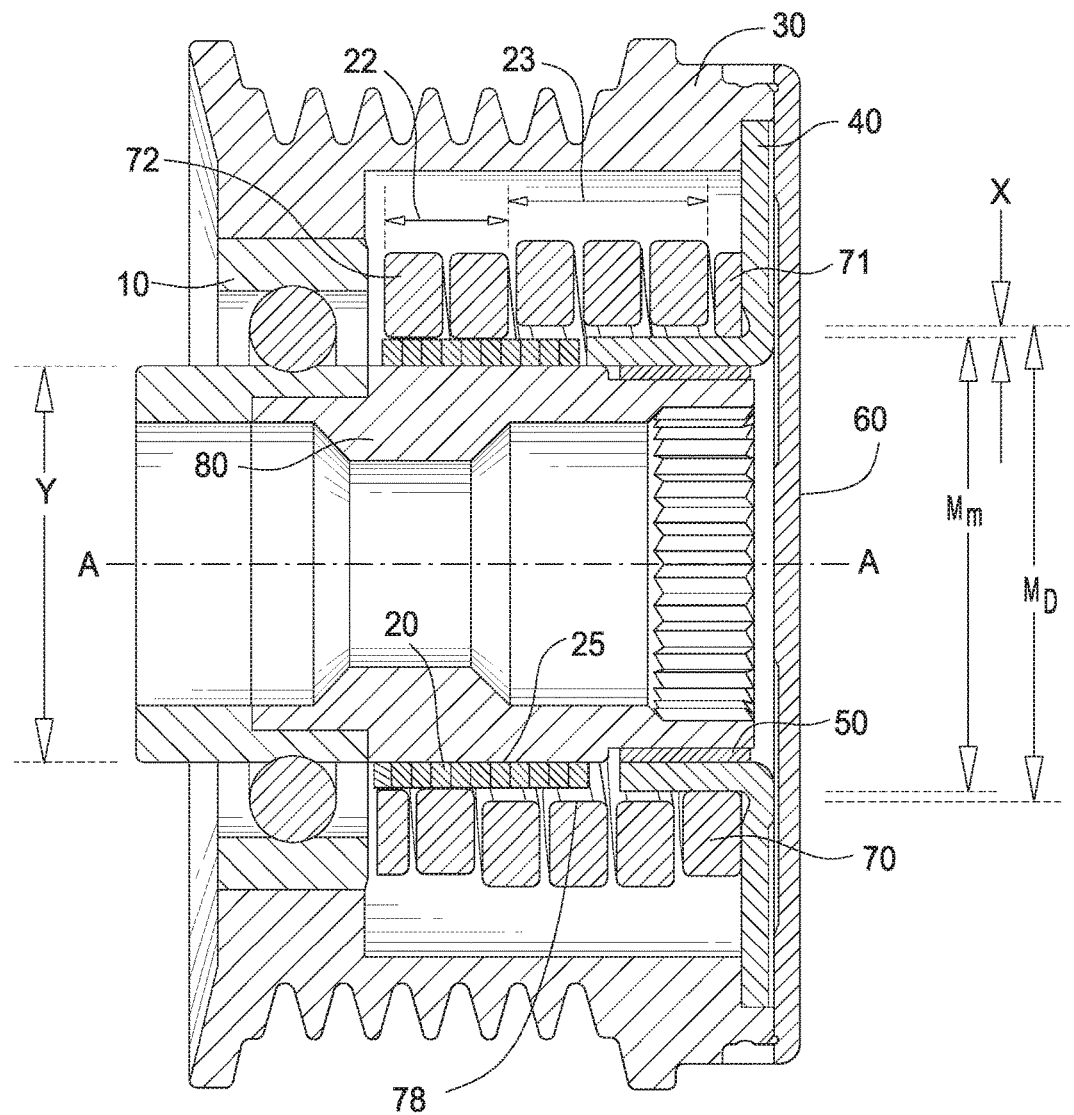
FIG. 1 is a cross section of the device.

FIG. 1 is a cross-section of the device. The isolating decoupler comprises a pulley 30, torsion spring 70, shaft 80, bearing 10, wrap spring one-way clutch 20, torsion spring retainer member 40, bushing 50, and dust cover 60.

Pulley 30 is rotationally installed on shaft 80 via bearing 10 and bushing 50. Bushing 50 is disposed between member 40 and shaft 80. Member 40 comprises an outer circumferential surface 41. Member 40 is press fit to pulley 30. Bearing 10 is a ball bearing or any other suitable bearing known in the art such as a needle bearing, roller bearing or the like.

One-way clutch member wrap spring 20 is installed on shaft 80 with a slight diameter interference, namely, the inner diameter of the wrap spring surface 25 is slightly less than the outer diameter of shaft 80, in particular shaft surface 81. Inner surface 25 of wrap spring 20 engages the outer surface 81 of shaft 80. Outer surface 81 has a diameter (Y).

Figure 2:
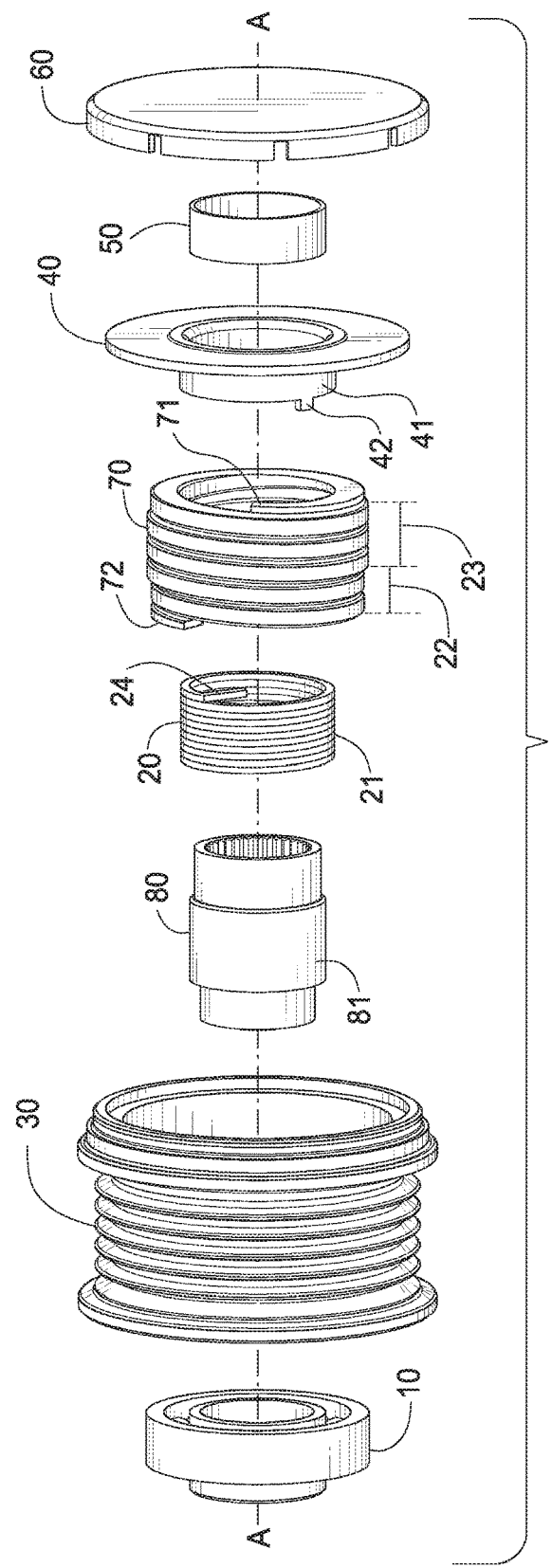
FIG. 2 is an exploded view of the device in FIG. 1.

FIG. 2 is an exploded view of the device in FIG. 1. Torsion spring 70 is connected between member 40 and wrap spring 20. A coil or coils at end 71 frictionally grip surface 41 by way of a slightly smaller inner diameter compared to the outer diameter of surface 41. End 72 of torsion spring 70 is directly connected to an end of wrap spring 20 by means of welding, laser welding, adhesives or other suitable method. The device rotates about axis A-A.

Torsion spring 70 comprises a section of coils 22 and a section of coils 23. Section 22 has a smaller (minor) diameter ($M_M$) than section 23, which has a major diameter ($M_D$). The minor diameter ($M_M$) is smaller than the major diameter ($M_D$) by a dimension "X". Section 22 is disposed radially directly outboard of the wrap spring 20.

During no load situations, section 22 of torsion spring 70 has a small clearance between its minor diameter $M_M$ and an outer surface of wrap spring 20. For example, the radial clearance between the two is in the range of 0.05 mm to 0.2 mm.

When load is applied by a belt (not shown) to pulley 30, torsion spring 70 is loaded in the winding direction through the end 71 which engages retainer 40. Wrap spring 20 is also loaded in the winding direction.

The other end of torsion spring 70 which is connected to wrap spring 20 resists the torsional loading because wrap spring 20 frictionally locks to shaft 80 due to its slight interference fit through surface 25. As the belt applied load increases the diameter of torsion spring 70 progressively decreases in a radial direction with respect to axis A-A. At some point section 22 of torsion spring 70 contacts the outer surface 21 of wrap spring 20.

By way of example, the torsion spring stiffness is about 0.3-0.4 Nm/degree and a maximum torque loading of the torsion spring is about 18-22 Nm. The overall angular displacement of end 71 of the torsion spring beyond end 72 is approximately 55 to 60 degrees. The torsion spring major diameter reduction at maximum load is about 1.3 to 1.6 mm.

Initial contact between torsion spring section 22 and wrap spring outer surface 21 occurs at approximately 10-15 degrees of angular displacement of end 71 beyond end 72, which is approximately 4 to 6 Nm of load, for example. The numbers provided herein are by way of example and are not intended to limit the scope of the invention.

When torsion spring 70 and wrap spring 20 contact each other the inner surface 78 of section 22 engages and begins squeezing wrap spring 20. At this point the bending stresses of the torsion spring cannot exceed 4-6 Nm since the torsion spring is locked on the wrap spring without the possibility of bending. Section 22 of torsion spring 70 acts as a wrap spring which is in turn wound over wrap spring 20. In effect, wrap spring 20 is pinched between torsion spring 70 and shaft surface 81. Section 22 of torsion spring then transfers torsional load from torsion spring 70 directly to shaft 80 through the body of wrap spring 20 without loading the wrap spring with tensile load. This has the effect of increasing the torque bearing capacity of the device beyond that which would be achieved if only the wrap spring was transmitting load.

Figure 3:
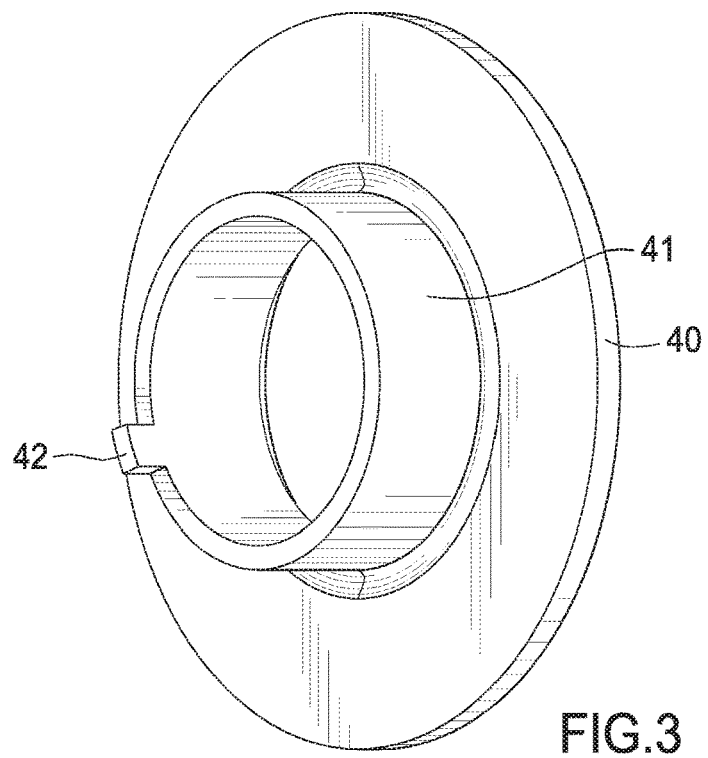
FIG. 3 is a perspective view of the torsion spring retainer.

FIG. 3 is a perspective view of the torsion spring retainer. As the load increases each coil of section 23 in progressive sequence engages the wrap spring by a radial reduction in diameter.

As a maximum load safety feature, tab 42 will approach and then engage end 24 of the wrap spring due to the progressive wind up of the torsion spring as load increases. As the load increases torsion spring 70 is wound tighter and tab 42 advances and then presses end 24 of spring 20 which has the effect of advancing end 24 in the unwinding direction, thereby causing wrap spring 20 to increase in diameter and thereby reduce or release its grip on shaft surface 81. This protects the device from damage in an overtorque situation.

Figure 4:
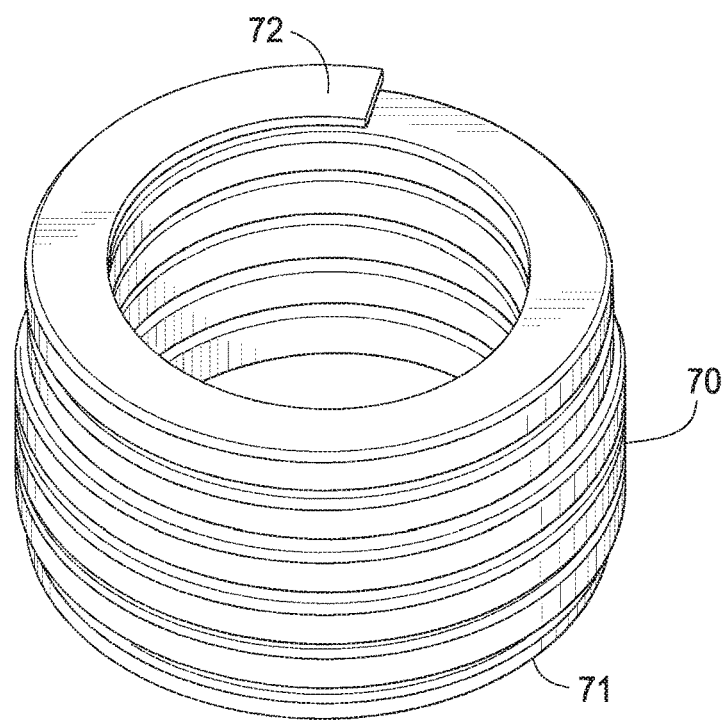
FIG. 4 is a perspective view of the torsion spring.

FIG. 4 is a perspective view of the torsion spring. End 71 of torsion spring 70 frictionally grips surface 41. This is accomplished by the torsion spring end coil or coils having an inner diameter which is slightly less than the outer diameter of surface 41. End 72 is welded to wrap spring 20.

Figure 5:
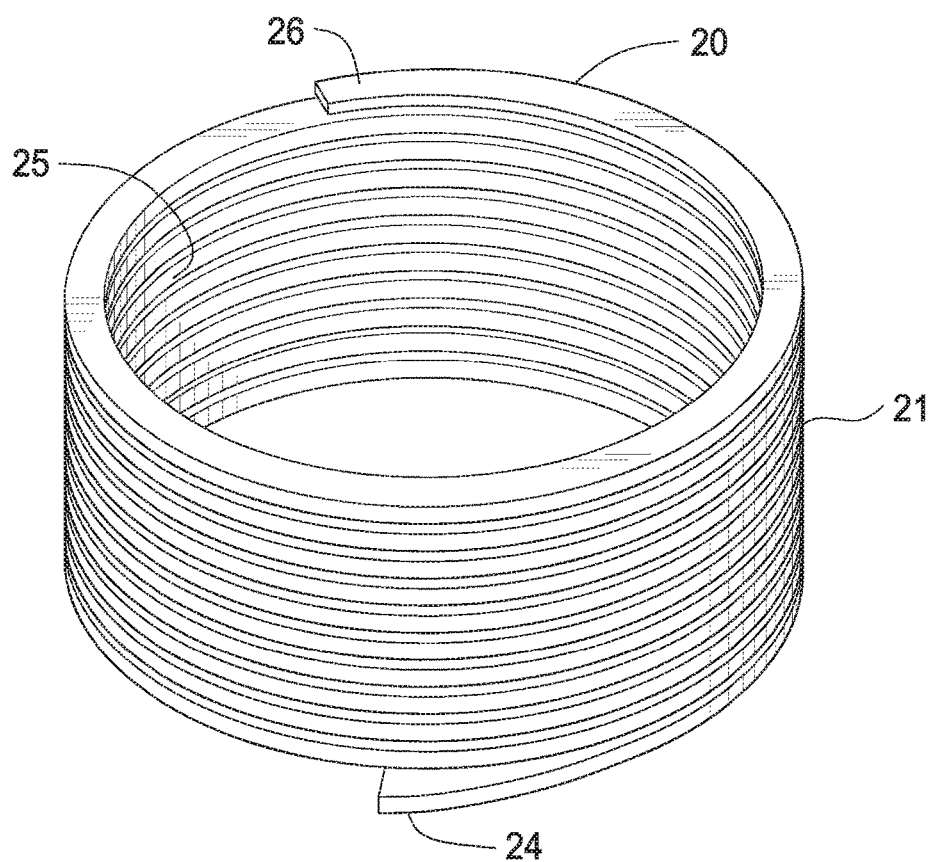
FIG. 5 is a perspective view of the wrap spring.

FIG. 5 is a perspective view of the wrap spring. In an overtorque condition tab 42 presses upon end 24 to cause spring 20 to unwind and thereby progressively release its grip on surface 81. Tab 42 extends in an axial direction. End 26 is welded as described herein to end 72 of torsion spring 70.

Figure 6:
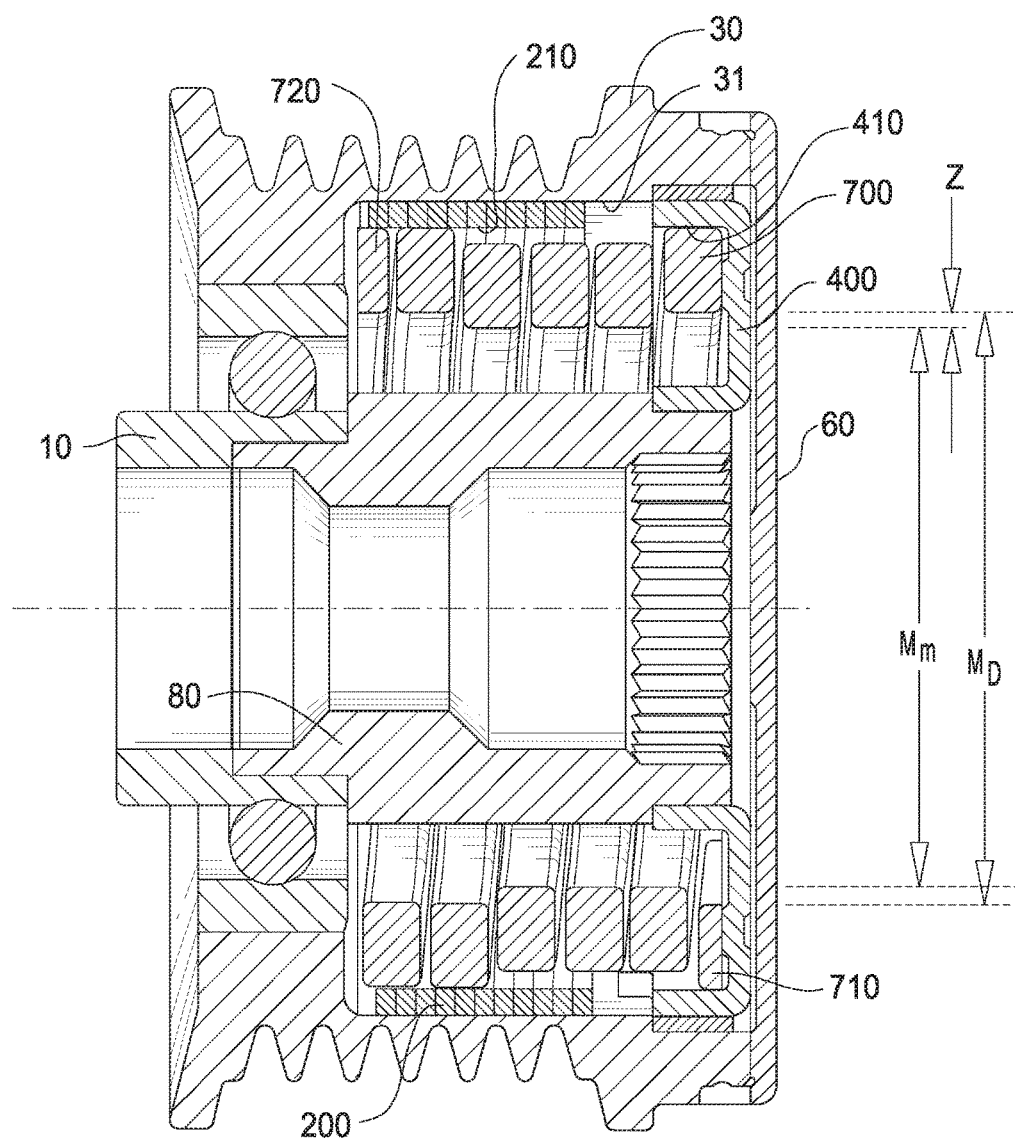
FIG. 6 is a cross section view of an alternate embodiment.

FIG. 6 is a cross section view of an alternate embodiment. Except as described herein the components of this alternate embodiment are as described for the first embodiment.

Torsion spring 700 is connected between member 400 and wrap spring 200. A coil or coils at end 710 frictionally grip surface 410 by way of a slightly larger outer diameter of the coils compared to the inner diameter of surface 410. End 720 of torsion spring 700 is directly connected to an end 250 of wrap spring 200 by means of welding, laser welding, adhesives or other suitable method.

The device rotates about axis A-A. Bushing 500 along with bearing 10 allows pulley 30 to rotate relative to retainer 400 and shaft 80. Retainer 400 is fixed or press fit to shaft 80.

Torsion spring 700 comprises a section of coils 220 and a section of coils 230. Section 220 has a smaller (minor) diameter ($M_M$) than section 230, which has a major diameter ($M_D$). The minor diameter ($M_M$) is smaller than the major diameter ($M_D$) by a dimension "Z". Section 230 is disposed radially directly inboard of the wrap spring 200 with respect to A-A.

During no load situations, section 230 of torsion spring 700 has a small clearance between its major diameter $M_D$ and an inner surface of wrap spring 200. For example, the radial clearance between the two is in the range of 0.05 mm to 0.2 mm.

When load is applied by a belt (not shown) to pulley 30, torsion spring 700 is loaded in the unwinding direction. This is due to the outer surface 260 of wrap spring 200 engaging pulley inner surface 31. Wrap spring 200 is loaded in the unwinding direction. Wrap spring 200 loads torsion spring 700. Wrap spring 200 is connected to torsion spring 700 at end 250, see FIG. 10.

The other end of torsion spring 700 which is connected to retainer 400 resists the torsional loading because wrap spring 200 frictionally locks to pulley surface 31 due to its slight interference fit. As the belt applied load increases the diameter of torsion spring 700 progressively increases in a radial direction with respect to axis A-A. At some point section 230 of torsion spring 700 contacts the inner surface 210 of wrap spring 200.

By way of example, the torsion spring stiffness is about 0.3-0.4 Nm/degree and a maximum torque loading of the torsion spring is about 18-22 Nm. The overall angular displacement of end 710 of the torsion spring beyond end 720 is approximately 55 to 60 degrees. The torsion spring 700 major diameter reduction at maximum load is about 1.3 to 1.6 mm.

Initial contact between torsion spring section 230 and wrap spring inner surface 210 occurs at approximately 10-15 degrees of angular displacement of end 720 beyond end 710, which is approximately 4 to 6 Nm of load, for example.

When torsion spring 700 and wrap spring 200 contact each other the outer surface 720 of section 230 engages and begins pressing wrap spring 200 outward to surface 31. At this point the bending stresses of the torsion spring cannot exceed 4-6 Nm since the torsion spring is locked on the wrap spring without the possibility of bending. Section 230 of torsion spring 700 acts as a wrap spring which is wound radially inboard of wrap spring 200. In effect, wrap spring 200 is pinched between torsion spring 700 and pulley surface 31.

Section 220 of torsion spring 700 then transfers torsional load from torsion spring 700 directly to shaft 80 without loading the wrap spring with tensile load due to the pinch effect. This has the effect of increasing the torque bearing capacity of the device beyond that which would be achieved if only the wrap spring was transmitting load.

As a maximum load safety feature, by angular rotation of the shaft relative to the pulley tab 420 will approach and then engage end 240 of the wrap spring. Under load wrap spring 200 is loaded in the unwinding direction. As the load increases tab 420 advances and then presses end 240 of spring 200 which has the effect of advancing end 240 in the wrap spring winding direction, thereby causing wrap spring 200 to reduce or release its grip on pulley surface 31. This protects the device from damage in an overtorque situation.

Figure 7:
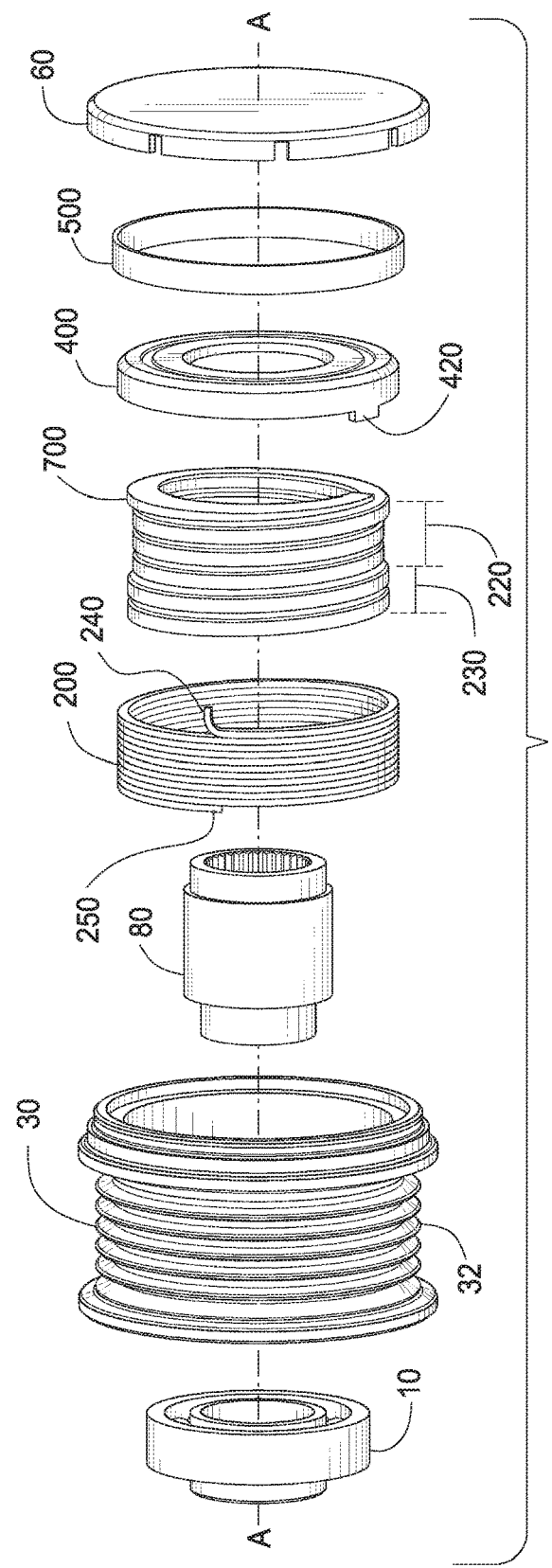
FIG. 7 is an exploded view of the alternate embodiment in FIG. 6.

FIG. 7 is an exploded view of the alternate embodiment in FIG. 6. Surface 32 is shaped to engage a multi-ribbed belt. Surface 32 may also be configured to engage any belt known in the art, including a v-belt or flat belt.

Figure 8:
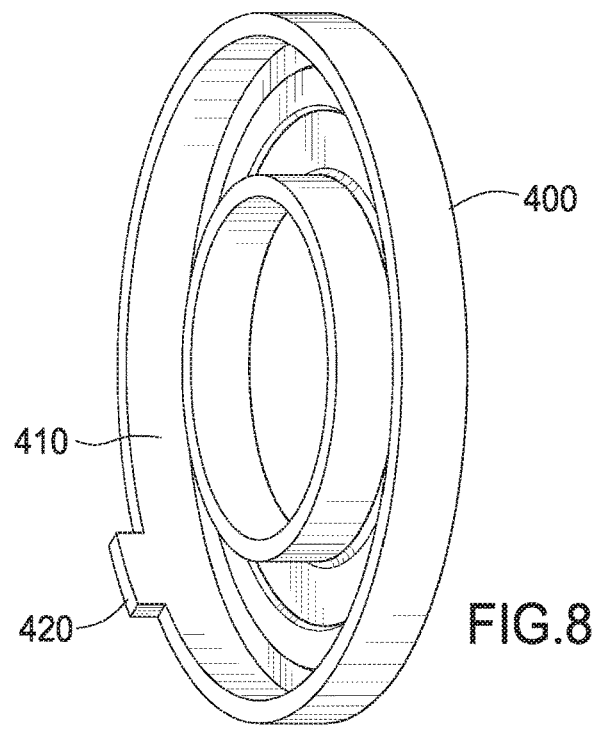
FIG. 8 is a perspective view of the alternate retainer.

FIG. 8 is a perspective view of the alternate retainer. Surface 410 frictionally engages end 710 of torsion spring 700.

Figure 9:
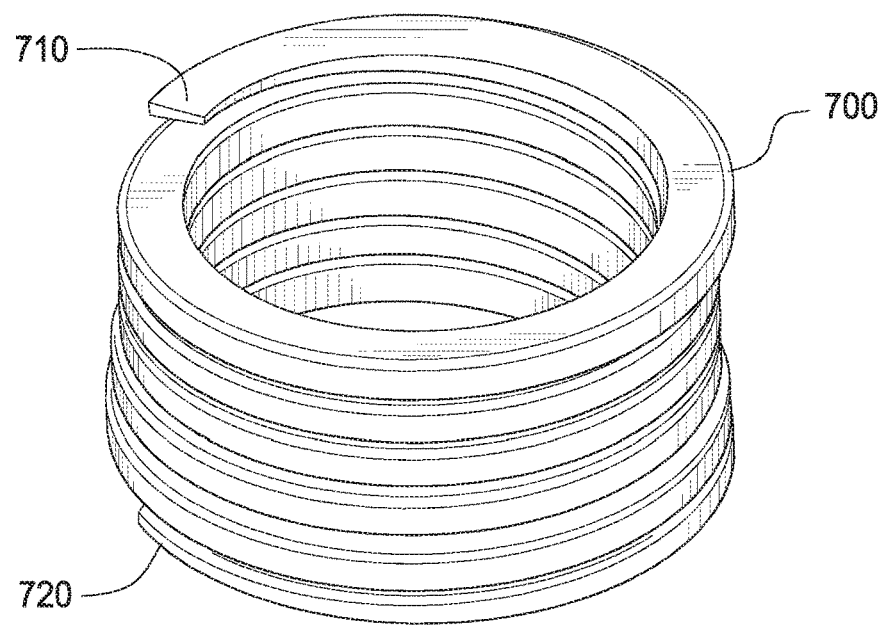
FIG. 9 is a perspective view of the alternate torsion spring.

FIG. 9 is a perspective view of the alternate torsion spring. End 720 is welded as described herein to end 250 of wrap spring 200.

Figure 10:
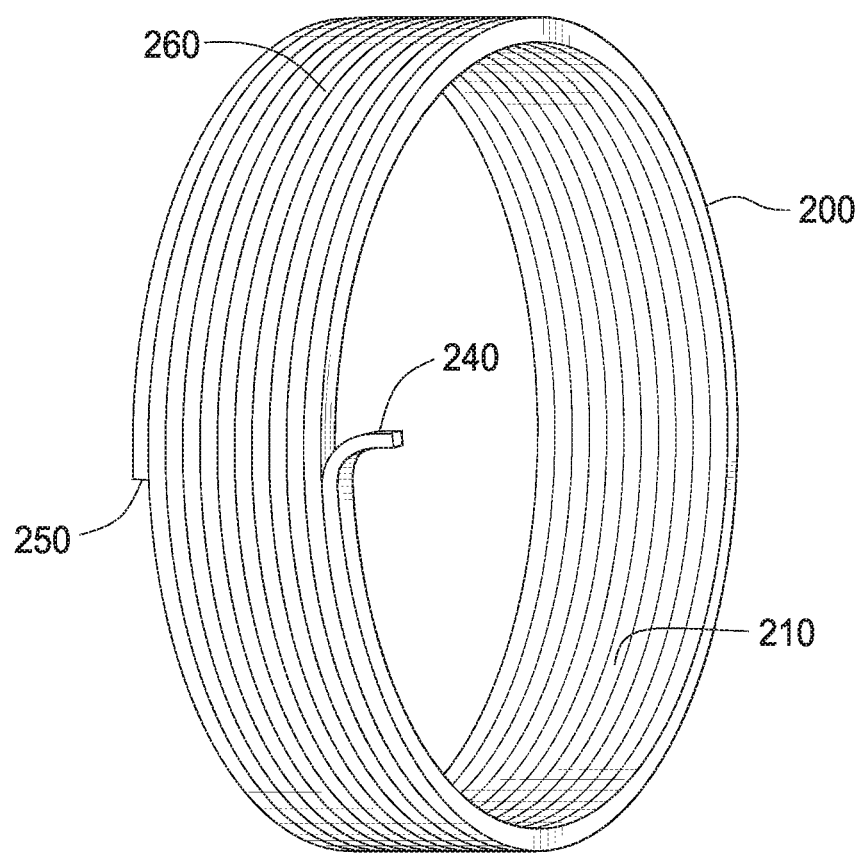
FIG. 10 is a perspective view of the alternate wrap spring.

FIG. 10 is a perspective view of the alternate wrap spring. Surface 260 frictionally engages surface 31 of pulley 30.

Figure 11:
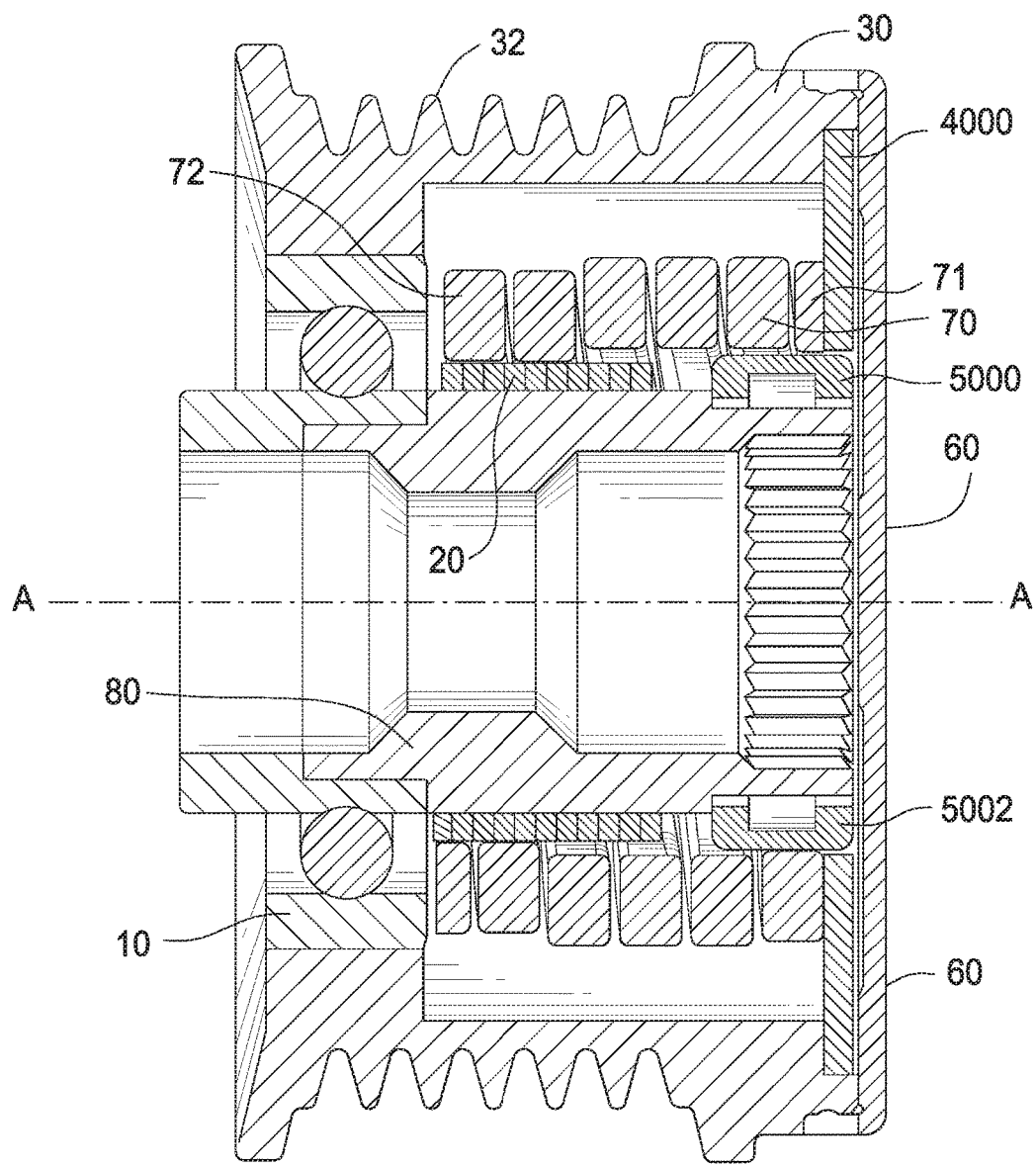
FIG. 11 is a cross section view of an alternate embodiment.

FIG. 11 is a cross section view of an alternate embodiment. In this alternate embodiment spring retainer 40 is replaced with retainer 4000. Retainer 4000 is fixed to pulley 30, for example, by press fit, adhesives or welding. Bushing 50 is replaced with a needle bearing 5000. Needle bearing 5000 comprises a tab 5001 which projects axially. Tab 5001 engages spring end 24. End 71 of torsion spring 70 is attached to retainer 4000 by adhesives, welding, solder, brazing or other means known in the art. End 71 frictionally grips the outer race 5002 of the needle bearing via an interference fit which results in a radially normal force applied to the outer race 5002. Surface 31 has a multi-ribbed profile.

As a maximum load safety feature, by angular rotation of the pulley relative to the shaft, tab 5001 will approach and then engage end 24 of the wrap spring 20. Under load wrap spring 20 is loaded in the winding direction. As the load increases torsion spring 70 wraps tighter and tab 5001 advances and then presses end 24 of spring 20 which has the effect of advancing end 24 in the wrap spring unwinding direction, thereby causing wrap spring 20 to increase in diameter and thereby reduce or release its frictional grip on shaft surface 81. This protects the device from damage in an overtorque situation.

Figure 12:
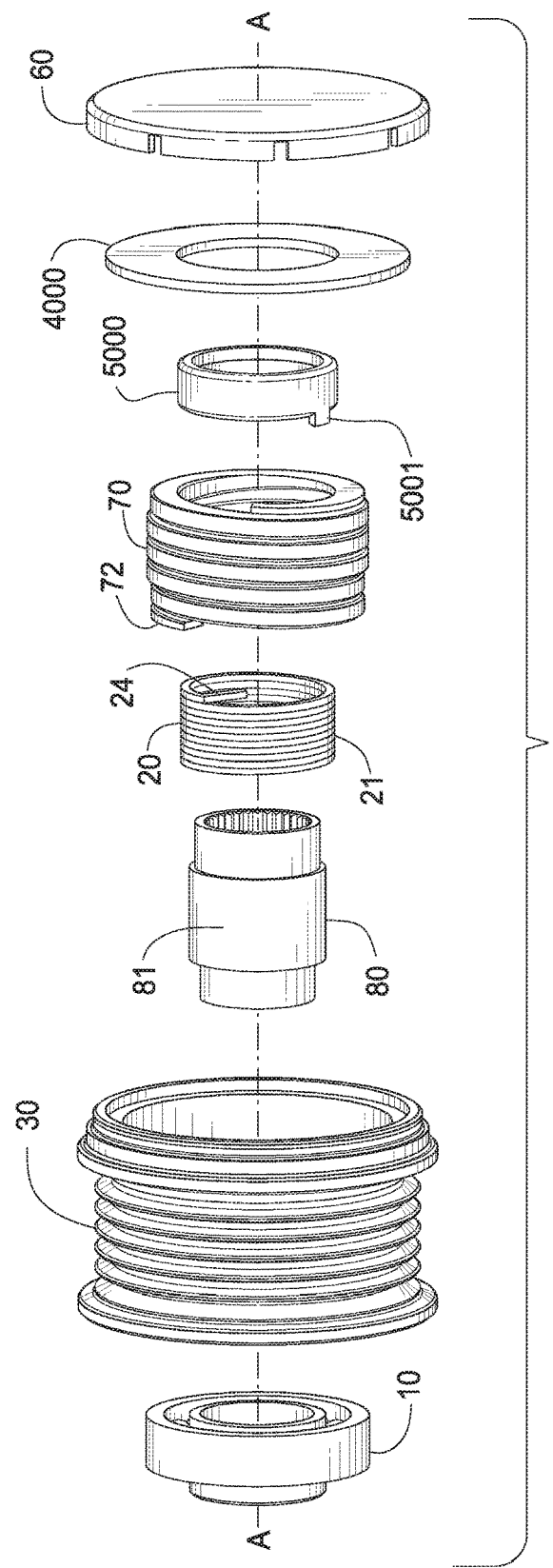
FIG. 12 is an exploded view of the alternate embodiment in FIG. 11.

FIG. 12 is an exploded view of the alternate embodiment in FIG. 11. Needle bearing 5000 comprises tab 5001 extending from outer race 5002. Tab 5001 extends in an axial direction parallel to axis A-A.

An isolating decoupler comprising a shaft having an outer surface, a pulley rotationally engaged about the shaft, a torsion spring having a first section having a major diameter and a second section having a minor diameter, the major diameter is greater than the minor diameter, the torsion spring engaged with the pulley, a wrap spring having an inner diameter less than an outer surface outer diameter, the wrap spring frictionally engaging the outer surface, the wrap spring is loaded in a winding direction, the torsion spring having an end fixedly connected to the wrap spring, the torsion spring loaded in a winding direction whereby the diameter of each coil of the torsion spring decreases in a progressive sequence as a load increases, the second section is disposed radially outboard of the wrap spring such that the second section moves radially inward to clamp the wrap spring during a load condition, and the pulley comprising a member disposed to progressively release the wrap spring from the shaft outer surface upon occurrence of a predetermined load condition.

An isolating decoupler comprising a shaft having an outer surface, a pulley rotationally engaged about the shaft, a torsion spring having a first section having a first diameter and a second section having a second diameter, the first diameter is not equal to the second diameter, the torsion spring engaged with the pulley, a one-way clutch member frictionally engaging the outer surface, the one-way clutch member loaded in a winding direction, the torsion spring having an end fixedly connected to the one-way clutch member, the torsion spring loaded in a winding direction whereby the diameter of each coil of the torsion spring changes diameter in a progressive sequence as a load increases, the second section is disposed radially outboard of the one-way clutch member such that the second section moves radially to clamp the one-way clutch member during a load condition, and the pulley comprising a member disposed to progressively release the one-way clutch member from the outer surface upon occurrence of a predetermined load condition.

Although forms of the invention have been described herein, it will be obvious to those skilled in the art that variations may be made in the construction and relation of parts without departing from the spirit and scope of the invention described herein.

We claim:

1. An isolating decoupler comprising:
    a shaft having an outer surface (81);
    a pulley (30) rotationally engaged about the shaft;
    a torsion spring (70) having a first section (23) having a major diameter and a second section (22) having a minor diameter, the major diameter is greater than the minor diameter, the torsion spring engaged with the pulley;
    a wrap spring (20) having an inner diameter less than an outer surface outer diameter, the wrap spring frictionally engaging the outer surface;
    the wrap spring is loaded in a winding direction;
    the torsion spring having an end (72) fixedly connected to the wrap spring;
    the torsion spring loaded in a winding direction whereby the diameter of each coil of the torsion spring decreases in a progressive sequence as a load increases; and
    the second section is disposed radially outboard of the wrap spring such that the second section moves radially inward to clamp the wrap spring during a load condition.

2. The isolating decoupler as in claim 1, wherein the pulley comprises a member disposed to progressively release the wrap spring engagement from the shaft outer surface upon occurrence of a predetermined load condition.

3. The isolating decoupler as in claim 1, wherein the first section does not contact the wrap spring.

4. An isolating decoupler comprising:
    a shaft;
    a pulley having an inner surface, the pulley rotationally engaged about the shaft;

a torsion spring having a first section having a major diameter and a second section having a minor diameter, the major diameter is greater than the minor diameter, the torsion spring engaged with the shaft;

a wrap spring having an outer diameter greater than an inner surface diameter, the wrap spring frictionally engaging the inner surface;

the wrap spring loaded in an unwinding direction;

the torsion spring having an end fixedly connected to the wrap spring;

the torsion spring loaded in an unwinding direction whereby the diameter of each coil of the torsion spring increases in a progressive sequence as a load increases;

the first section is disposed radially inboard of the wrap spring such that the first section moves radially outward to clamp the wrap spring during a load condition.

5. The isolating decoupler as in claim 4, wherein the shaft comprises a member disposed to progressively release the wrap spring from the pulley inner surface upon occurrence of a predetermined load condition.

6. The isolating decoupler as in claim 4, wherein the second section does not contact the wrap spring.

7. An isolating decoupler comprising:

a shaft having an outer surface;

a pulley rotationally engaged about the shaft;

a torsion spring having a first section having a first diameter and a second section having a second diameter, the first diameter is not equal to the second diameter, the torsion spring engaged with the pulley;

a one-way clutch member frictionally engaging the outer surface;

the one-way clutch member loaded in a winding direction;

the torsion spring having an end fixedly connected to the one-way clutch member;

the torsion spring loaded in a winding direction whereby the diameter of each coil of the torsion spring changes diameter in a progressive sequence as a load increases;

the second section is disposed radially outboard of the one-way clutch member such that the second section moves radially to clamp the one-way clutch member during a load condition; and the pulley comprising a member disposed to progressively release the one-way clutch member frictional engagement from the outer surface upon occurrence of a predetermined load condition.

8. An isolating decoupler comprising:

a shaft;

a pulley having an inner surface, the pulley rotationally engaged about the shaft;

a torsion spring having a first section having a major diameter and a second section having a minor diameter, the major diameter is greater than the minor diameter, the torsion spring engaged with the shaft;

a wrap spring having an outer diameter greater than an inner surface diameter, the wrap spring frictionally engaging the inner surface;

the wrap spring loaded in an unwinding direction;

the torsion spring having an end fixedly connected to the wrap spring;

the torsion spring loaded in an unwinding direction whereby the diameter of each coil of the torsion spring increases in a progressive sequence as a load increases;

the first section is disposed radially inboard of the wrap spring such that the first section moves radially outward to clamp the wrap spring during a load condition; and the shaft comprises a member disposed to progressively release the wrap spring from the inner surface upon occurrence of a predetermined load condition.

9. The isolating decoupler as in claim 7 further comprising a bearing disposed between the pulley and the shaft.

10. The isolating decoupler as in claim 9, wherein the member extends from a bearing race.

11. The isolating decoupler as in claim 7, wherein the member projects in an axial direction parallel to an axis of rotation A-A.

12. The isolating decoupler as in claim 7, wherein the member projects from a retainer fixed to the shaft.

* * * * *